United States Patent
Akiyama

(10) Patent No.: US 12,487,514 B2
(45) Date of Patent: Dec. 2, 2025

(54) LIGHT SOURCE DEVICE AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 434 days.

(21) Appl. No.: 18/189,257

(22) Filed: Mar. 24, 2023

(65) Prior Publication Data

US 2023/0305374 A1    Sep. 28, 2023

(30) Foreign Application Priority Data

Mar. 24, 2022  (JP) ................. 2022-047977

(51) Int. Cl.
    G03B 21/20    (2006.01)
(52) U.S. Cl.
    CPC ......... G03B 21/204 (2013.01); G03B 21/206 (2013.01); G03B 21/2066 (2013.01)
(58) Field of Classification Search
    CPC . G03B 21/204; G03B 21/206; G03B 21/2066
    USPC .......................................................... 353/31
    See application file for complete search history.

(56) References Cited

U.S. PATENT DOCUMENTS

| 2008/0123343 | A1 | 5/2008 | Kobayashi et al. |
| 2018/0017856 | A1 | 1/2018 | Tanaka et al. |
| 2020/0026169 | A1* | 1/2020 | Chang ................ G03B 21/2013 |
| 2022/0206376 | A1* | 6/2022 | Akiyama ............. G03B 21/204 |

FOREIGN PATENT DOCUMENTS

| JP | 2008-026853 A | 2/2008 |
| JP | 2012-209036 A | 10/2012 |
| JP | 2013-250494 A | 12/2013 |
| JP | 2018-013764 A | 1/2018 |

* cited by examiner

Primary Examiner — Magda Cruz
(74) Attorney, Agent, or Firm — Dority & Manning, P.A.

(57) ABSTRACT

A light source device includes a substrate having a supporting surface, a first light source disposed at the substrate and emitting a first light, a first optical member having a first optical layer facing the supporting surface and reflecting the first light, a first wavelength conversion layer having a light incident surface and converting the first light into second light, a light emitting portion formed by at least the substrate and the first optical member, and a second optical member disposed at the light emitting portion and having a second optical layer which reflects the first light and transmits the second light. The first optical layer is inclined with respect to the light incident surface and reflects the second light. The first wavelength conversion layer is disposed on one of a surface of the first optical layer and the supporting surface. The light emitting portion emits the second light.

18 Claims, 10 Drawing Sheets

LIGHT SOURCE DEVICE AND PROJECTOR

The present application is based on, and claims priority from JP Application Serial Number 2022-047977, filed Mar. 24, 2022, the disclosure of which is hereby incorporated by reference herein in its entirety.

BACKGROUND

1. Technical Field

The present disclosure relates to a light source device and a projector.

2. Related Art

In related art, a light source device generating an illumination light using fluorescence emitted from a phosphor when the phosphor is irradiated with an excitation light output from a light source is proposed. For example, JP-A-2018-013764 discloses a light source device using a reflective phosphor wheel outputting fluorescence from a surface to which an excitation light is entered.

However, in the light source device, there is a problem that extraction efficiency of the fluorescence emitted by the phosphor is not sufficient, and thereby, the fluorescence is not efficiently used as the illumination light, and light use efficiency of the fluorescence becomes lower.

SUMMARY

In order to solve the above described problem, a light source device according to an aspect of the present disclosure includes a substrate having a supporting surface, a first light source disposed at a supporting surface side of the substrate and configured to emit first light in a first wavelength range, a first optical member having a first optical layer facing the supporting surface and reflecting the first light emitted from the first light source, a first wavelength conversion layer having a light-incident surface that the first light output from the first light source enters, and configured to convert the first light into second light in a second wavelength range different from the first wavelength range and emit the second light from the light-incident surface, a light emitting portion formed by at least the substrate and the first optical member, and a second optical member disposed at the light emitting portion and having a second optical layer configured to reflect the first light and transmit the second light. The first optical layer is inclined with respect to the light-incident surface and configured to reflect further the second light. The first wavelength conversion layer is disposed on one of a surface at the substrate side of the first optical layer and the supporting surface of the substrate. The light emitting portion emits the second light.

A projector according to an aspect of the present disclosure includes the light source device according the aspect of the present disclosure, a light modulation device modulating a light emitted from the light source device, and a projection optical device projecting the light modulated by the light modulation device.

DESCRIPTION OF EXEMPLARY EMBODIMENTS

Figure 1:
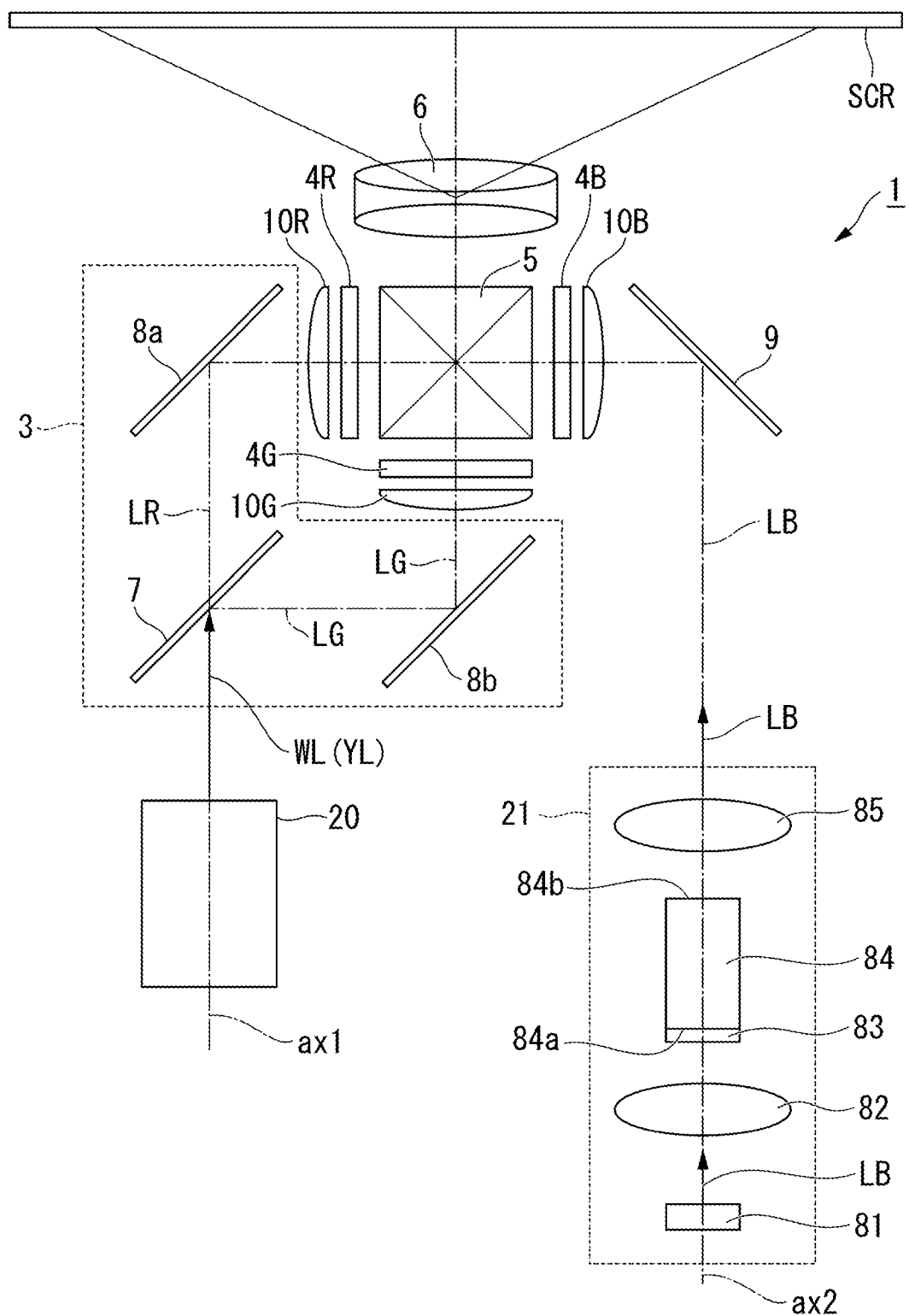
FIG. 1 shows a schematic configuration of a projector according to a first embodiment.

As below, embodiments of the present disclosure will be explained in detail with reference to the drawings.

In the drawings used in the following explanation, to facilitate visualization of the characteristics, characteristic parts may be enlarged for convenience and dimension ratios of the respective component elements etc. are not necessarily the same as real ones.

First Embodiment

An example of a projector according to an embodiment will be explained.

FIG. 1 shows a schematic configuration of the projector according to the embodiment.

As shown in FIG. 1, a projector 1 of the embodiment is a projection-type image display apparatus displaying a color picture on a screen SCR. The projector 1 includes a color separation optical system 3, a light modulation device 4R, a light modulation device 4G, a light modulation device 4B, a light combining system 5, a projection optical device 6, a first illumination device 20, and a second illumination device 21

The color separation optical system 3 separates a yellow illumination light WL from the first illumination device 20 into a red light LR and a green light LG. The color separation optical system 3 includes a dichroic mirror 7, a first reflection mirror 8a, and a second reflection mirror 8b.

The dichroic mirror 7 separates the illumination light WL into the red light LR and the green light LG. The dichroic mirror 7 transmits the red light LR and reflects the green light LG of the illumination light WL. The second reflection mirror 8b reflects the green light LG toward the light modulation device 4B. The first reflection mirror 8a is placed in an optical path of the red light LR and reflects the red light LR transmitted through the dichroic mirror 7 toward the light modulation device 4R.

On the other hand, a blue light LB output from the second illumination device 21 is reflected by a reflection mirror 9 toward the light modulation device 4B.

Here, the configuration of the second illumination device 21 is explained.

The second illumination device 21 includes a light source 81, a condenser lens 82, a diffuser plate 83, a rod lens 84, and a relay lens 85. The light source 81 includes at least one semiconductor laser and outputs the blue light LB of a laser beam. Note that the light source 81 is not limited to the semiconductor laser, but may be an LED emitting a blue light.

The condenser lens 82 includes a convex lens and substantially focuses and enters the blue light LB into the diffuser plate 83. The diffuser plate 83 diffuses the blue light LB from the light source 81 with predetermined diffusivity, and generates the blue light LB having a uniform intensity distribution close to that of the illumination light WL output from the first illumination device 20. As the diffuser plate 83, e.g., a frosted glass of optical glass may be used.

The blue light LB diffused by the diffuser plate 83 enters the rod lens 84. The rod lens 84 has a prism shape extending along an illumination optical axis ax2 of the second illumination device 21, and has a light incident end face 84a provided on one end and a light exiting end face 84b provided on the other end. The diffuser plate 83 is fixed to the light incident end face 84a of the rod lens 84 via an optical adhesive (not shown). It is desirable that the refractive index of the diffuser plate 83 and the refractive index of the rod lens 84 are set to be as equal as possible.

The blue light LB is totally reflected and propagates within the rod lens 84 and is output from the light exiting end face 84b with increased uniformity of the illuminance distribution. The blue light LB output from the rod lens 84 enters the relay lens 85. The relay lens 85 enters the blue light LB with the uniformity of the illuminance distribution increased by the rod lens 84 into the reflection mirror 9.

The shape of the light exiting end face 84b of the rod lens 84 is a rectangular shape substantially similar to the shape of the image formation area of the light modulation device 4B. Thereby, the blue light LB output from the rod lens 84 efficiently enters the image formation area of the light modulation device 4B.

The light modulation device 4R modulates the red light LR according to image information and forms an image light corresponding to the red light LR. The light modulation device 4G modulates the green light LG according to the image information and forms an image light corresponding to the green light LG. The light modulation device 4B modulates the blue light LB according to the image information and forms an image light corresponding to the blue light LB.

For the light modulation device 4R, the light modulation device 4G, and the light modulation device 4B, e.g., transmissive liquid crystal panels are used. Further, polarizers (not shown) are respectively placed at the light incident-sides and the light exiting-sides of the liquid crystal panels to pass only linear-polarized lights in particular directions.

A field lens 10R, a field lens 10G, and a field lens 10B are placed at the light incident-sides of the light modulation device 4R, the light modulation device 4G, and the light modulation device 4B, respectively. The field lens 10R, the field lens 10G, and the field lens 10B parallelize the principal rays of the red light LR, the green light LG, and the blue light LB entering the light modulation device 4R, the light modulation device 4G, and the light modulation device 4B, respectively.

The image lights output from the light modulation device 4R, the light modulation device 4G, and the light modulation device 4B enter the light combining system 5, and the system combines the image lights corresponding to the red light LR, the green light LG, and the blue light LB and outputs the combined image light toward the projection optical device 6. For the light combining system 5, e.g., a cross dichroic prism is used.

The projection optical device 6 includes a plurality of lenses. The projection optical device 6 enlarges and projects the image light combined by the light combining system 5 toward the screen SCR. Thereby, an image is displayed on the screen SCR.

Figure 2:
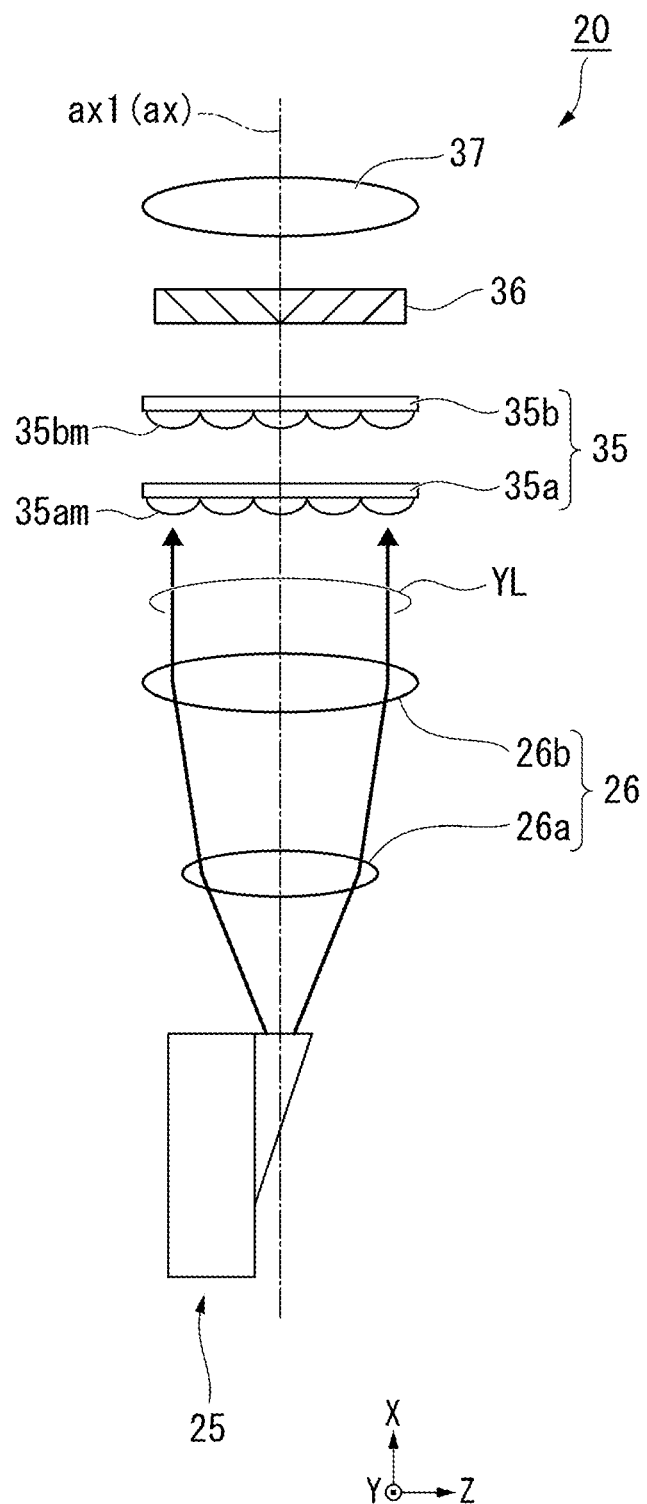
FIG. 2 is a schematic configuration diagram of a first illumination device.

FIG. 2 is a schematic configuration diagram of the first illumination device 20.

As shown in FIG. 2, the first illumination device 20 includes a light source device 25, a pickup optical system 26, an optical integration system 35, a polarization conversion element 36, and a superimposing lens 37.

The light source device 25 outputs the yellow illumination light WL toward the pickup optical system 26.

As below, a configuration of the light source device 25 will be explained in detail. In the following drawings, the respective configurations of the light source device 25 will be explained using an XYZ coordinate system as necessary. An X-axis is an axis parallel to an optical axis ax of the light source device 25, a Z-axis is an axis orthogonal to the optical axis ax and parallel to the normal of a substrate 252 forming the light source device 25, and a Y-axis is an axis respectively orthogonal to the X-axis and the Z-axis. Note that the optical axis ax of the light source device 25 is aligned with an illumination optical axis ax1 of the first illumination device 20 shown in FIG. 2.

Figure 3:
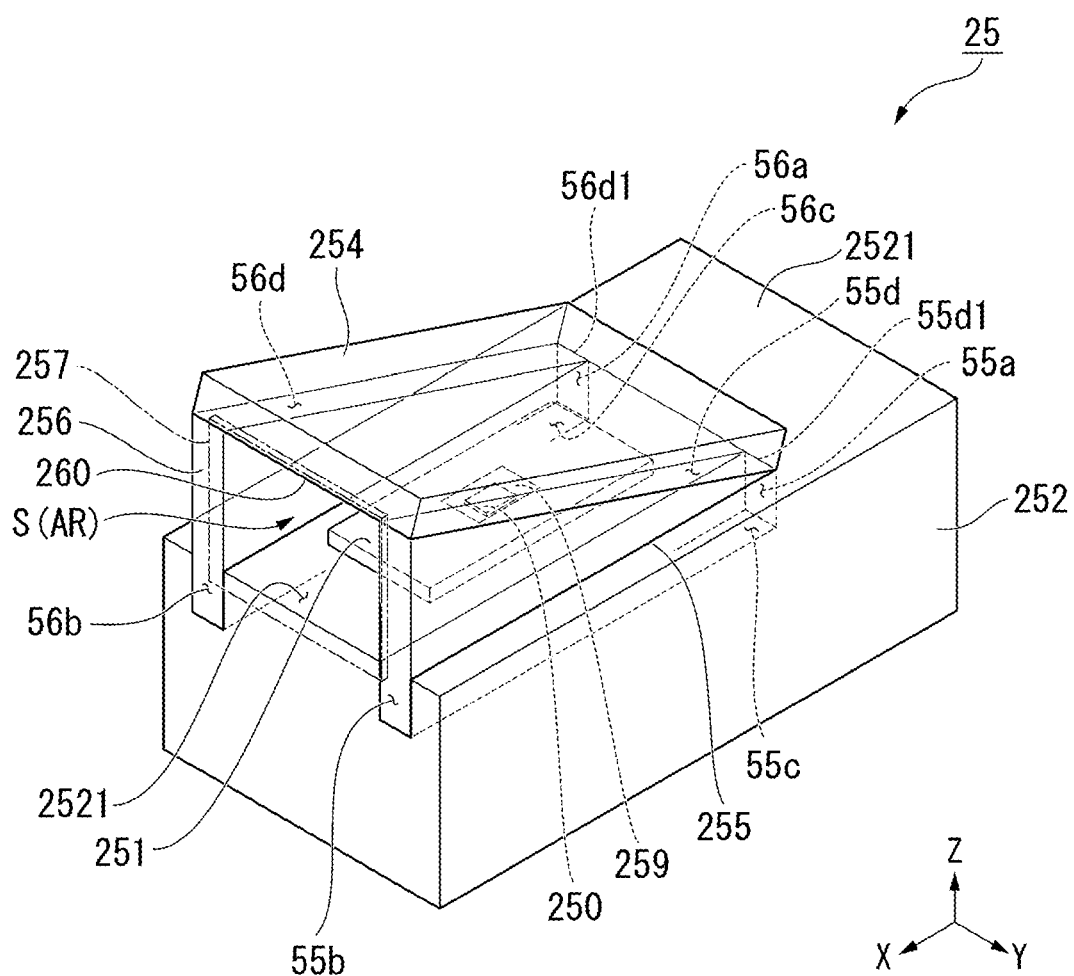
FIG. 3 is a perspective view showing a configuration of a main part of a light source device.
Figure 4:
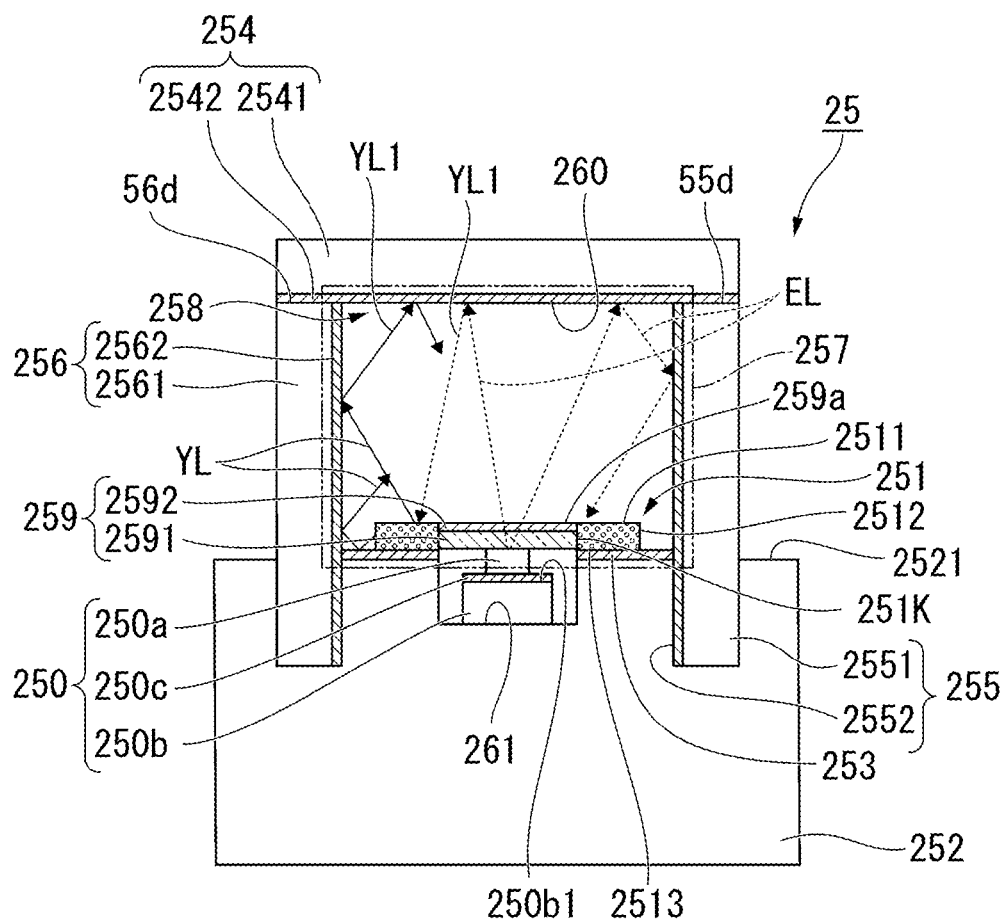
FIG. 4 is a front view of the light source device.
Figure 5:
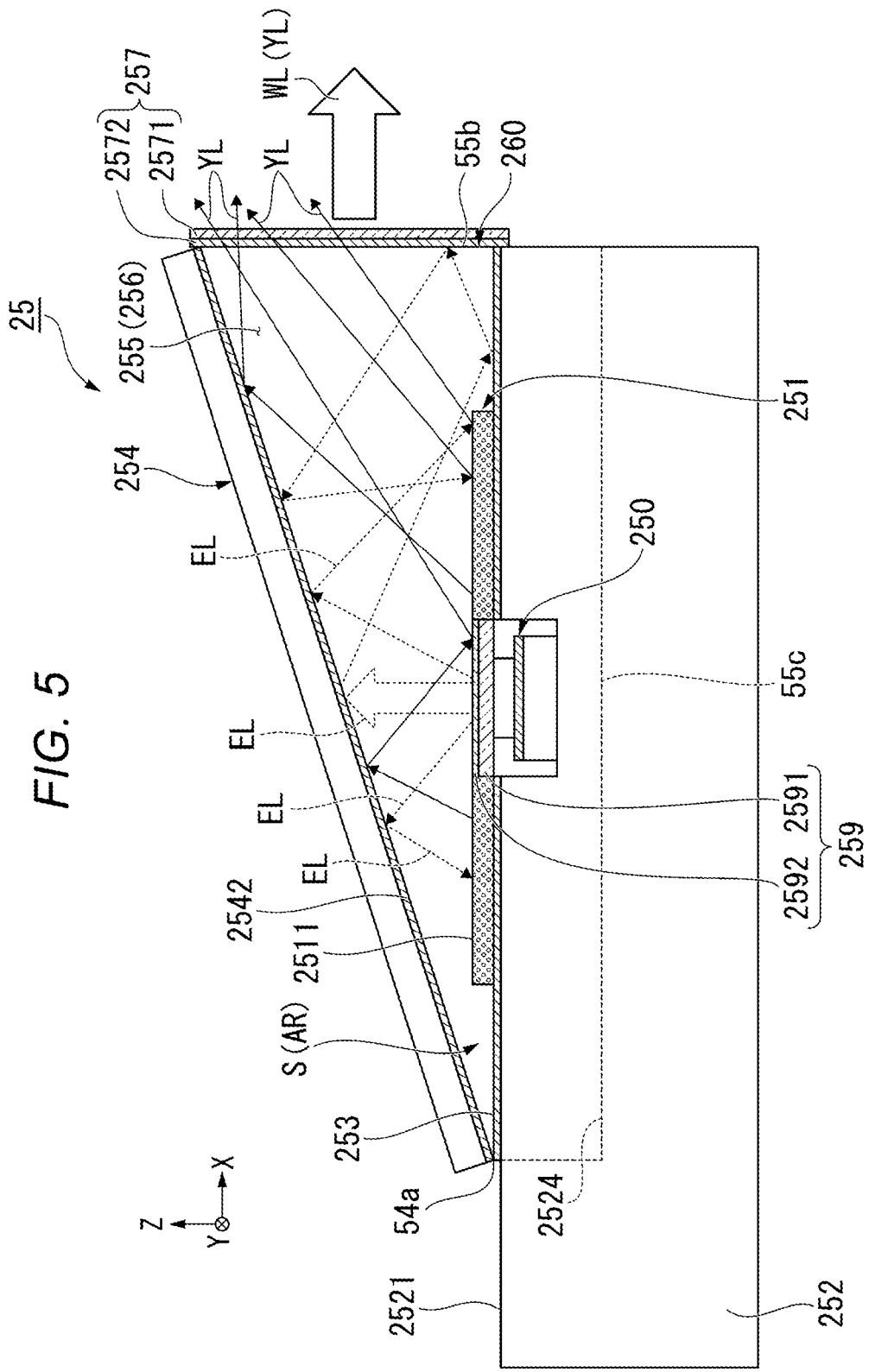
FIG. 5 is a sectional view of the light source device.

FIG. 3 is a perspective view showing a configuration of a main part of the light source device 25. FIG. 4 is a front view of the light source device 25 as seen from the +X side. FIG. 5 is a sectional view of the light source device 25 along a plane along the XZ-plane.

As shown in FIGS. 3 to 5, the light source device 25 of the embodiment includes a light source (first light source) 250, a phosphor layer (first wavelength conversion layer) 251, the substrate 252, a mirror layer 253, a first optical member 254, a second optical member 257, a third optical member 255, a fourth optical member 256, a light-transmissive member 259, and a light emitting portion 260.

The light emitting portion 260 of the embodiment is an opening formed by the respective end surfaces at the +X side of the substrate 252, the first optical member 254, the third optical member 255, and the fourth optical member 256. The light emitting portion 260 outputs fluorescence generated in the phosphor layer 251.

The light source 250 has a light emitting device 250a, a base member 250b, and a reflection layer 250c. The light emitting device 250a includes a light emitting diode (LED) and outputs an excitation light (first light) EL. The excitation light EL is a light having a blue wavelength range (first wavelength range) from 400 nm to 480 nm e.g., a light beam having a peak wavelength of 455 nm. The base member 250b supports the light emitting device 250a and also functions as a heat dissipation substrate dissipating heat from the light emitting device 250a. The reflection layer 250c is provided between the base member 250b and the light emitting device 250a, specifically, on a front surface 250b1 as a surface of the base member 250b at the light emitting device 250a side. The reflection layer 250c includes e.g., a metal layer or a dielectric layer.

The substrate 252 has a supporting surface 2521 supporting the phosphor layer 251. The substrate 252 is a metal plate having a higher heat dissipation property of aluminum or copper.

The supporting surface 2521 is a surface parallel to the XY-plane. A concave portion 261 is formed in the supporting surface 2521 of the substrate 252. The light source 250 is provided at the supporting surface 2521 side of the substrate 252. In the embodiment, the light source 250 is placed in the concave portion 261 formed in the supporting surface 2521. The base member 250b of the light source 250 and the front surface of the concave portion 261 are thermally coupled. The light source 250 is thermally coupled to the substrate 252, and thereby, the light emitting device 250a may be cooled by dissipation of heat from the light source 250 to the substrate 252.

The phosphor layer 251 is a plate-like phosphor having a front surface (light incident surface) 2511, a side surface 2512, and a back surface 2513. The front surface 2511 is a surface into which the excitation light EL is entered. The side surface 2512 is a surface crossing the front surface 2511. The side surface 2512 may be orthogonal to the front surface 2511. The back surface 2513 is an opposite surface to the front surface 2511.

In the embodiment, the excitation light EL output from the first optical member 254, which will be described later, enters the front surface 2511 of the phosphor layer 251.

The phosphor layer 251 contains phosphor particles excited by the excitation light EL and emitting e.g., fluorescence (second light) YL as a yellow light having a yellow wavelength range (second wavelength range) from 550 to 640 nm. As the phosphor particles, e.g., a YAG (yttrium aluminum garnet) phosphor may be used. Note that one kind of material may be used to form the phosphor particles, or particles formed using two or more kinds of materials may be mixed and used as the phosphor particles. As the phosphor layer 251, e.g., a phosphor layer formed by dispersion of phosphor particles in an inorganic binder such as alumina, a phosphor layer formed by sintering of phosphor particles without using a binder may be used. The phosphor layer 251 contains a plurality of scatterers. As the scatterers, pores or permeable particles having a different refractive index from the phosphor are used. In the case of the embodiment, pores are used as the scatterers.

The substrate 252 is thermally coupled to the phosphor layer 251. The substrate 252 is thermally coupled to the phosphor layer 251, and thereby, the phosphor layer 251 is cooled by dissipation of heat of the phosphor layer 251.

The phosphor layer 251 of the embodiment has a cutout 251K formed by partially cutting out. The cutout 251K is provided to penetrate the phosphor layer 251 and exposes a part of the substrate 252.

The phosphor layer 251 is supported by the supporting surface 2521 of the substrate 252 with the concave portion 261 facing within the cutout 251K in a plan view. As described above, the light source 250 is placed in the concave portion 261. Accordingly, the light source 250 is placed in the cutout 251K. The cutout 251K has a rectangular planar shape. The size of the cutout 251K is equal to or slightly larger than that of the outer shape of the light source 250.

The mirror layer 253 is provided between the substrate 252 and the phosphor layer 251. The area of the mirror layer 253 is larger than the area of the back surface 2513 of the phosphor layer 251. The mirror layer 253 is provided at least around the phosphor layer 251 on the supporting surface 2521 of the substrate 252. The phosphor layer 251 is joined to the supporting surface 2521 of the substrate 252 via the mirror layer 253. The mirror layer 253 includes e.g., a metal layer or a dielectric layer. Note that the mirror layer 253 may be formed in the whole area of the supporting surface 2521. Further, a part of the mirror layer 253 may be directly formed on the back surface 2513 of the phosphor layer 251.

The first optical member 254 is placed to face the supporting surface 2521 of the substrate 252. That is, the first optical member 254 is placed to face the front surface 2511 of the phosphor layer 251. The first optical member 254 is placed not into contact with the phosphor layer 251.

The first optical member 254 is placed to incline relative to the front surface 2511 of the phosphor layer 251. The angle in the first optical member 254 relative to the front surface 2511 of the phosphor layer 251 is set to an acute angle.

The first optical member 254 includes a base member 2541 and a first optical layer 2542. As the material forming the base member 2541, e.g., any one of a light-transmissive member of alumina, sapphire, glass, or the like or a member without light transmissivity of a metal or the like may be used. The first optical layer 2542 includes e.g., a dielectric multilayer film or a metal film. The first optical member 254 functions as a mirror reflecting the entering light. The first optical layer 2542 reflects the fluorescence YL (second light), which will be described later, in addition to the excitation light EL from the light source 250.

In the embodiment, the phosphor layer 251 converts the excitation light EL output from the light source 250 and reflected by the first optical layer 2542 of the first optical member 254 into the fluorescence YL and outputs the fluorescence from the front surface 2511.

As shown in FIGS. 4 and 5, the light-transmissive member 259 is provided in contact at the light exiting-side (+Z side) of the light source 250. In the case of the embodiment, the light-transmissive member 259 is in contact with the light emitting device 250a of the light source 250. The light-transmissive member 259 has a size equal to that of the cutout 251K formed in the phosphor layer 251 and fitted in the cutout 251K. The light-transmissive member 259 also functions as a heat dissipation member for the light emitting device 250a of the light source 250.

In the embodiment, a front surface 259a of the light-transmissive member 259 at the first optical member 254 side is level with the front surface 2511 of the phosphor layer 251. That is, the front surface 259a of the light-transmissive member 259 and the front surface 2511 of the phosphor layer 251 are placed on the same plane in directions along the normal of the supporting surface 2521 of the substrate 252.

The light-transmissive member 259 includes a light-transmissive substrate 2591 and a third optical layer 2592. The light-transmissive substrate 2591 is formed using a light-transmissive member of alumina, sapphire, glass, or the like. The third optical layer 2592 is provided on the outer surface of the light-transmissive substrate 2591, that is, at the opposite side to the light source 250. The third optical layer 2592 has a property of transmitting the excitation light EL and reflecting fluorescence. Thereby, the light-transmissive member 259 transmits the excitation light EL output from the light source 250 and reflects the fluorescence YL generated in the phosphor layer 251. Note that an antireflection film such as an AR coating is provided on the inner surface of the light-transmissive substrate 2591, that is, at the light source 250 side. Thereby, the light-transmissive member 259 suppresses the reflection of the excitation light EL output from the light source 250, and thereby, efficiently enters the excitation light into the member.

The third optical member 255 includes a base member 2551 and a fourth optical layer 2552. As the material forming the base member 2551, e.g., any one of a light-transmissive member of alumina, sapphire, glass, or the like or a member without light transmissivity of a metal or the like may be used. The fourth optical layer 2552 is formed on the inner surface of the base member 2551. The fourth optical layer 2552 includes e.g., a dielectric multilayer film or a metal film.

The third optical member 255 is placed to cross the supporting surface 2521 of the substrate 252 and the first optical member 254. The third optical member 255 is placed with the fourth optical layer 2552 crossing the supporting surface 2521 and the first optical layer 2542. The third optical member 255 may be orthogonal to the supporting surface 2521 of the substrate 252 and the first optical member 254. The fourth optical layer 2552 may be orthogonal to the supporting surface 2521 and the first optical layer 2542. The third optical member 255 is placed in thickness directions along the Y-axis directions. The third optical member 255 is placed near the +Y side of the phosphor layer 251. Accordingly, a part of the fluorescence YL output from the phosphor layer 251 toward the +Y side is reflected by the fourth optical layer 2552 of the third optical member 255. The third optical member 255 reflects the excitation light EL in addition to the fluorescence YL.

The third optical member 255 has a trapezoidal plate shape.

As shown in FIG. 3, the third optical member 255 includes a first end surface 55a forming an upper bottom portion of the trapezoidal shape, a second end surface 55b forming a lower bottom portion of the trapezoidal shape, a third end surface 55c coupling the first end surface 55a and the second end surface 55b at the +X side, and a fourth end surface 55d coupling the first end surface 55a and the second end surface 55b at the −X side. Note that all of the first end surface 55a, the second end surface 55b, the third end surface 55c, and the fourth end surface 55d are planar surfaces. The third end surface 55c is a surface facing the substrate 252. The fourth end surface 55d is a surface at the opposite side to the third end surface 55c in the base member 2551. The first optical member 254 is in contact with the fourth end surface 55d. The first optical member 254 is mounted on the fourth end surface 55d. The first optical layer 2542 is in contact with the fourth end surface 55d. The base member 2541 is mounted on the fourth end surface 55d via the first optical layer 2542.

Here, when glass is used as the material of the base member 2551, chamfering for preventing a crack by removing sharp portions is necessary. In the embodiment, the third optical member 255 is formed in the trapezoidal plate shape and chamfering is unnecessary, and thereby, workability of the base member 2551 is increased.

In the case of the embodiment, a part of the third optical member 255 is embedded in the substrate 252. Therefore, the third optical member 255 is strongly supported by the substrate 252.

A part of an end portion at the +X side in the third optical member 255 is fitted in a groove 2524 formed in the supporting surface 2521 of the substrate 252. Note that a gap between the third optical member 255 and the groove 2524 may be filled with an adhesive.

Specifically, in the third optical member 255, the whole first end surface 55a and third end surface 55c and a part of the second end surface 55b are fitted in the groove 2524. An end side 55d1 located at the most −X side of the fourth end surface 55d along the Z directions is level with the supporting surface 2521 of the substrate 252. Thereby, the fourth end surface 55d and the supporting surface 2521 of the substrate 252 are smoothly coupled. Further, at the +X side, the second end surface 55b is level with the end surface of the substrate 252.

The fourth optical member 256 has the same configuration as the third optical member 255.

That is, the fourth optical member 256 includes a base member 2561 and a fifth optical layer 2562. The fifth optical layer 2562 is formed on the inner surface of the base member 2561.

The fourth optical member 256 is placed to cross the supporting surface 2521 of the substrate 252 and the first optical member 254 and face the third optical member 255. The fourth optical member 256 is placed with the fifth optical layer 2562 crossing the supporting surface 2521 and the first optical layer 2542 and facing the fourth optical layer 2552. The fourth optical member 256 may be orthogonal to the supporting surface 2521 of the substrate 252 and the first optical member 254. The fifth optical layer 2562 may be orthogonal to the supporting surface 2521 and the first optical layer 2542. The fourth optical member 256 is placed in thickness directions along the Y-axis directions. The fourth optical member 256 is placed near the −Y side of the phosphor layer 251. Accordingly, the fluorescence YL output from the phosphor layer 251 toward the −Y side and entering the fourth optical member 256 is reflected by the fifth optical layer 2562 of the fourth optical member 256. The fourth optical member 256 reflects the excitation light EL in addition to the fluorescence YL.

The fourth optical member 256 has the same trapezoidal plate shape as the third optical member 255.

The fourth optical member 256 includes a first end surface 56a forming an upper bottom portion of the trapezoidal shape, a second end surface 56b forming a lower bottom portion of the trapezoidal shape, a third end surface 56c coupling the first end surface 56a and the second end surface 56b at the +X side, and a fourth end surface 56d coupling the first end surface 56a and the second end surface 56b at the −X side. Note that all of the first end surface 56a, the second end surface 56b, the third end surface 56c, and the fourth end surface 56d are planar surfaces. The third end surface 56c is a surface facing the substrate 252. The fourth end surface 56d is a surface at the opposite side to the third end surface 56c in the base member 2561. The first optical member 254 is in contact with the fourth end surface 56d. The first optical member 254 is mounted on the fourth end surface 56d. The first optical layer 2542 is in contact with the fourth end surface 56d. The base member 2541 is mounted on the fourth end surface 56d via the first optical layer 2542.

In the case of the embodiment, a part of the fourth optical member 256 is embedded in the substrate 252, and the fourth optical member 256 is strongly supported by the substrate 252.

A part of an end portion at the +X side in the fourth optical member 256 is fitted in the groove 2524 formed in the supporting surface 2521 of the substrate 252. A gap between the fourth optical member 256 and the groove 2524 may be filled with an adhesive.

Specifically, in the fourth optical member 256, the whole first end surface 56a and third end surface 56c and a part of the second end surface 56b are fitted in the groove 2524. An end side 56d1 located at the most −X side of the fourth end surface 56d along the Z directions is level with the supporting surface 2521 of the substrate 252. Thereby, the fourth end surface 56d and the supporting surface 2521 of the substrate 252 are smoothly coupled. Further, at the +X side, the second end surface 56b is level with the end surface of the substrate 252.

In the embodiment, the first optical member 254 is supported by the third optical member 255 and the fourth optical member 256. The first optical member 254 is bonded and fixed to the third optical member 255 and the fourth optical member 256.

Specifically, the first optical member 254 is provided over between the fourth end surface 55d of the third optical member 255 and the fourth end surface 56d of the fourth optical member 256. At the −X side, an end side 54a inside of the first optical member 254 is in contact with the supporting surface 2521 of the substrate 252.

According to the configuration, the light source device 25 of the embodiment closes the −X side by the substrate 252, the first optical member 254, the third optical member 255, and the fourth optical member 256 and forms the light emitting portion 260 at the +X side. Therefore, the light source device 25 may prevent a leakage of light from the opposite side to the light emitting portion 260 in the fluorescence YL and efficiently output a light from the light emitting portion 260.

In the light source device 25 of the embodiment, the second optical member 257 is placed to cover the light emitting portion 260. The second optical member 257 includes a light-transmissive substrate 2571 and a second optical layer 2572. The light-transmissive substrate 2571 is formed using e.g., a glass thin plate. The second optical layer 2572 includes e.g., a dichroic layer transmitting the fluorescence (second light) YL having a yellow wavelength range (second wavelength range) from 550 to 640 nm and reflecting a light in a blue wavelength range containing the excitation light EL.

Accordingly, the light emitting portion 260 may selectively extract the yellow light containing the fluorescence YL as the illumination light WL by the second optical member 257.

In the light source device 25 of the embodiment, the phosphor layer 251 is housed in a housing space S surrounded by the substrate 252, the first optical member 254, the second optical member 257, the third optical member 255, and the fourth optical member 256. In the housing space S, e.g., an air layer AR is provided.

The light source 250 radiates the excitation light EL by Lambertian emission. The excitation light EL output from the light source 250 by Lambertian emission enters the first optical member 254 placed to face the light source 250 and is reflected toward the supporting surface 2521 of the substrate 252 by the first optical layer 2542 of the first optical member 254. The excitation light EL reflected by the first optical layer 2542 enters the phosphor layer 251 provided on the supporting surface 2521. The phosphor layer 251 outputs the fluorescence YL generated by wavelength conversion of the excitation light EL from the front surface 2511. At least a part of the fluorescence YL output from the phosphor layer 251 is transmitted through the second optical member 257 covering the light emitting portion 260 and output as the illumination light WL.

A part of the excitation light EL reflected by the first optical layer 2542 travels toward the light emitting portion 260 and is reflected by the second optical layer 2572 of the second optical member 257 covering the light emitting portion 260. The excitation light EL reflected by the second optical layer 2572 eventually enters the phosphor layer 251 and is used for excitation of the fluorescence YL.

Further, a part of the excitation light EL reflected by the first optical layer 2542 enters the supporting surface 2521 of the substrate 252 and is reflected by the mirror layer 253 formed on the supporting surface 2521. At least a part of the excitation light EL reflected by the mirror layer 253 is reflected by the second optical layer 2572 of the second optical member 257, and eventually enters the phosphor layer 251 and is used for excitation of the fluorescence YL.

Furthermore, a part of the excitation light EL reflected by the first optical layer 2542 enters the light-transmissive member 259, is transmitted through the third optical layer 2592 provided on the outer surface of the light-transmissive member 259, and enters the light source 250 side. A part of the excitation light EL transmitted through the third optical layer 2592 is reflected by the reflection layer 250c of the light source 250, transmitted through the light-transmissive member 259, and output toward the first optical member 254. Then, the part of the excitation light is reflected by the first optical layer 2542 of the first optical member 254, and thereby, reused for excitation of the phosphor layer 251.

A part of the fluorescence YL output from the phosphor layer 251 is reflected by the first optical member 254, transmitted through the second optical member 257, and output from the light emitting portion 260. Note that a part of the fluorescence YL reflected by the first optical member 254 and entering the phosphor layer 251 is transmitted through the phosphor layer 251 and reflected by the mirror layer 253, and thereby, transmitted through the second optical member 257 and output from the light emitting portion 260.

Further, a part of the fluorescence YL output from the phosphor layer 251 enters the third optical member 255 or the fourth optical member 256 via the mirror layer 253 or directly enters the third optical member 255 or the fourth optical member 256. Then, at least a part of the fluorescence YL reflected by the third optical member 255 or the fourth optical member 256 is transmitted through the second optical member 257 and output from the light emitting portion 260.

Note that a part of the excitation light EL reflected by the first optical member 254 propagates in the opposite direction (−Y side) to the light emitting portion 260, is repeatedly reflected and eventually enters the phosphor layer 251, and used for excitation of the fluorescence YL.

Furthermore, a part of the fluorescence YL output from the phosphor layer 251 propagates in the opposite direction (−Y side) to the light emitting portion 260, and is repeatedly reflected and eventually output from the light emitting portion 260.

As described above, in the light source device 25 of the embodiment, the excitation light EL output from the light source 250 may be efficiently entered into the phosphor layer 251 and the illumination light WL containing the fluorescence YL generated in the phosphor layer 251 may be output from the light emitting portion 260.

In the light source device 25 of the embodiment, in the phosphor layer 251, heat tends to accumulate and the temperature tends to be higher at the −X side as the opposite side to the light emitting portion 260 compared to the light emitting portion 260 side outputting the fluorescence YL. On the other hand, in the light source device 25 of the embodiment, as shown in FIGS. 3 and 5, the substrate 252 supporting the phosphor layer 251 in a shape elongated to the opposite side to the light emitting portion 260 is employed. Therefore, according to the light source device 25 of the embodiment, in the phosphor layer 251, the opposite side to the light emitting portion 260 where heat tends to accumulate may be efficiently cooled. Thus, the phosphor layer 251 may be efficiently cooled.

The illumination light WL output from the light source device 25 enters the pickup optical system 26. The pickup optical system 26 includes e.g., pickup lenses 26a, 26b. The pickup optical system 26 has a function of picking up and parallelizing the illumination light WL output from the light source device 25.

The illumination light WL enters the optical integration system 35. The optical integration system 35 includes e.g., a first lens array 35a and a second lens array 35b.

The first lens array 35a includes a plurality of first small lenses 35am and the second lens array 35b includes a plurality of second small lenses 35bm.

The first lens array 35a separates the illumination light WL into a plurality of small pencils of light. The first small lenses 35am focus the small pencils of light on the corresponding second small lenses 35bm. The optical integration system 35 uniformizes the illuminance distributions of the image formation areas of the light modulation devices 4R, 4G, 4B shown in FIG. 1 as illuminated areas in cooperation with the superimposing lens 37, which will be described later.

The illumination light WL passing through the optical integration system 35 enters the polarization conversion element 36. The polarization conversion element 36 includes e.g., a polarization separation film and a retardation film (half-wave plate). The polarization conversion element 36 converts the polarization directions in the illumination light WL into one polarization component.

The illumination light WL passing through the polarization conversion element 36 enters the superimposing lens 37. The illumination light WL output from the superimposing lens 37 enters the color separation optical system 3. The superimposing lens 37 superimposes the plurality of small pencils of light forming the illumination light WL in the illuminated areas, i.e., the image formation areas of the light modulation devices 4R, 4G on one another for uniform illumination.

According to the light source device 25 of the above described embodiment, the following effects are exerted.

The light source device 25 of the embodiment includes the substrate 252 having the supporting surface 2521, the light source 250 placed at the supporting surface 2521 side and outputting the excitation light EL, the first optical member 254 having the first optical layer 2542 facing the supporting surface 2521 and reflecting the excitation light EL output from the light source 250, the phosphor layer 251 having the front surface 2511 that the excitation light EL output from the light source 250 enters, converting the excitation light EL into the fluorescence YL, and outputting the fluorescence YL from the front surface 2511, the light emitting portion 260 formed by at least the substrate 252 and the first optical member 254 and outputting the illumination light WL, and the second optical member 257 having the second optical layer 2572 reflecting the excitation light EL and transmitting the fluorescence YL and placed in the light emitting portion 260. The first optical layer 2542 inclines relative to the front surface 2511 and reflects the fluorescence YL, and the phosphor layer 251 is placed on the supporting surface 2521 of the substrate 252.

According to the light source device 25 of the embodiment, the fluorescence YL may be efficiently extracted as the illumination light WL by the second optical member 257 placed in the light emitting portion 260. Further, the excitation light EL output toward the light emitting portion 260 is reentered into the phosphor layer 251 by the second optical member 257, and thereby, conversion efficiency of the fluorescence YL may be increased.

Therefore, according to the light source device 25 of the embodiment, light use efficiency of the fluorescence YL is increased, and thereby, the bright illumination light WL may be output from the light emitting portion 260.

The light source device 25 of the embodiment outputs the illumination light WL from the light emitting portion 260, and thereby, etendue may be reduced. In the light source device 25 of the embodiment, etendue may be reduced without reduction of the incident area of the excitation light on the phosphor layer 251, and light density of the excitation light EL is not increased in the phosphor layer 251. Therefore, lowering of fluorescence conversion efficiency due to the increased light density is suppressed, and the bright fluorescence YL may be extracted as the illumination light WL.

In the light source device 25 of the embodiment, the phosphor layer 251 has the cutout 251K formed by partially cutting out, and the light source 250 is placed in the cutout 251K of the phosphor layer 251.

According to the configuration, the light source 250 may be placed in a desired position on the supporting surface 2521 without an interference with the phosphor layer 251. Accordingly, the degree of freedom of the layout of the light source 250 on the substrate 252 is increased.

In the light source device 25 of the embodiment, the light source 250 has the light emitting device 250a emitting the excitation light EL, the base member 250b supporting the light emitting device 250a, and the reflection layer 250c provided at the light emitting device 250a side of the base member 250b.

According to the configuration, the excitation light EL returned to the light source 250 side may be reflected by the reflection layer 250c and returned toward the first optical member 254 side. Accordingly, use efficiency of the excitation light EL may be increased.

The light source device 25 of the embodiment further includes the light-transmissive member 259 provided in contact with the light exiting side of the light source 250. Furthermore, the light-transmissive member 259 has the third optical layer 2592 provided at the opposite side to the light source 250, transmitting the excitation light EL, and reflecting the fluorescence YL.

According to the configuration, heat may be dissipated from the light source 250 by the light-transmissive member 259. Thereby, the heat of the light source 250 may be dissipated from both the substrate 252 and the light-transmissive member 259 and heat resistance of the light source 250 may be further increased.

Further, the light-transmissive member 259 may reflect and output a part of the fluorescence YL from the light emitting portion 260 by the third optical layer 2592. Therefore, the use light efficiency of the fluorescence YL may be further increased.

In the light source device 25 of the embodiment, the light source 250 is placed in the concave portion 261 formed in the supporting surface 2521 of the substrate 252, and the front surface 259a of the light-transmissive member 259 at the first optical member 254 side is level with the front surface 2511 of the phosphor layer 251.

According to the configuration, the light source 250 is placed in the concave portion 261, and thereby, the light source 250 and the first optical member 254 may be placed apart at a predetermined distance. Thereby, the excitation light EL output from the light source 250 by Lambertian emission may be efficiently entered into the entire area of the first optical member 254.

Further, no level difference is produced between the front surface 259a of the light-transmissive member 259 and the front surface 2511 of the phosphor layer 251, and thereby, the incident surface of the light entering from the first optical member 254 side may be a planar surface. Thereby, diffused reflection of the light entering from the first optical member 254 side may be suppressed and the illumination light WL may be efficiently extracted from the light emitting portion 260.

The light source device 25 of the embodiment further includes the third optical member 255 having the fourth optical layer 2552 reflecting the excitation light EL and the fluorescence YL and placed with the fourth optical layer 2552 crossing the supporting surface 2521 and the first optical layer 2542, and the fourth optical member 256 having the fifth optical layer 2562 reflecting the excitation light EL and the fluorescence YL and placed with the fifth optical layer 2562 crossing the supporting surface 2521 and the first optical layer 2542 and facing the fourth optical layer 2552. The light emitting portion 260 is formed by the substrate 252, the first optical member 254, the third optical member 255, and the fourth optical member 256.

According to the configuration, a leakage of light from other parts than the light emitting portion 260 is suppressed, and thereby, the illumination light WL may be efficiently output from the light emitting portion 260.

According to the projector 1 of the above described embodiment, the following effects are exerted.

The projector 1 of the embodiment includes the light source device 25, the light modulation devices 4B, 4G, 4R forming the image lights by modulating the blue light LB, the green light LG, and the red light LR from the light source device 25 according to the image information, and the projection optical device 6 projecting the above described image lights.

According to the projector 1 of the embodiment, the light source device 25 generating the bright illumination light WL is provided, and thereby, a high-brightness image may be formed and projected.

Second Embodiment

Subsequently, a configuration of a light source device according to a second embodiment of the present disclosure is explained. In the embodiment, the configurations or members in common with the first embodiment have the same signs and the explanation of the details is omitted.

Figure 6:
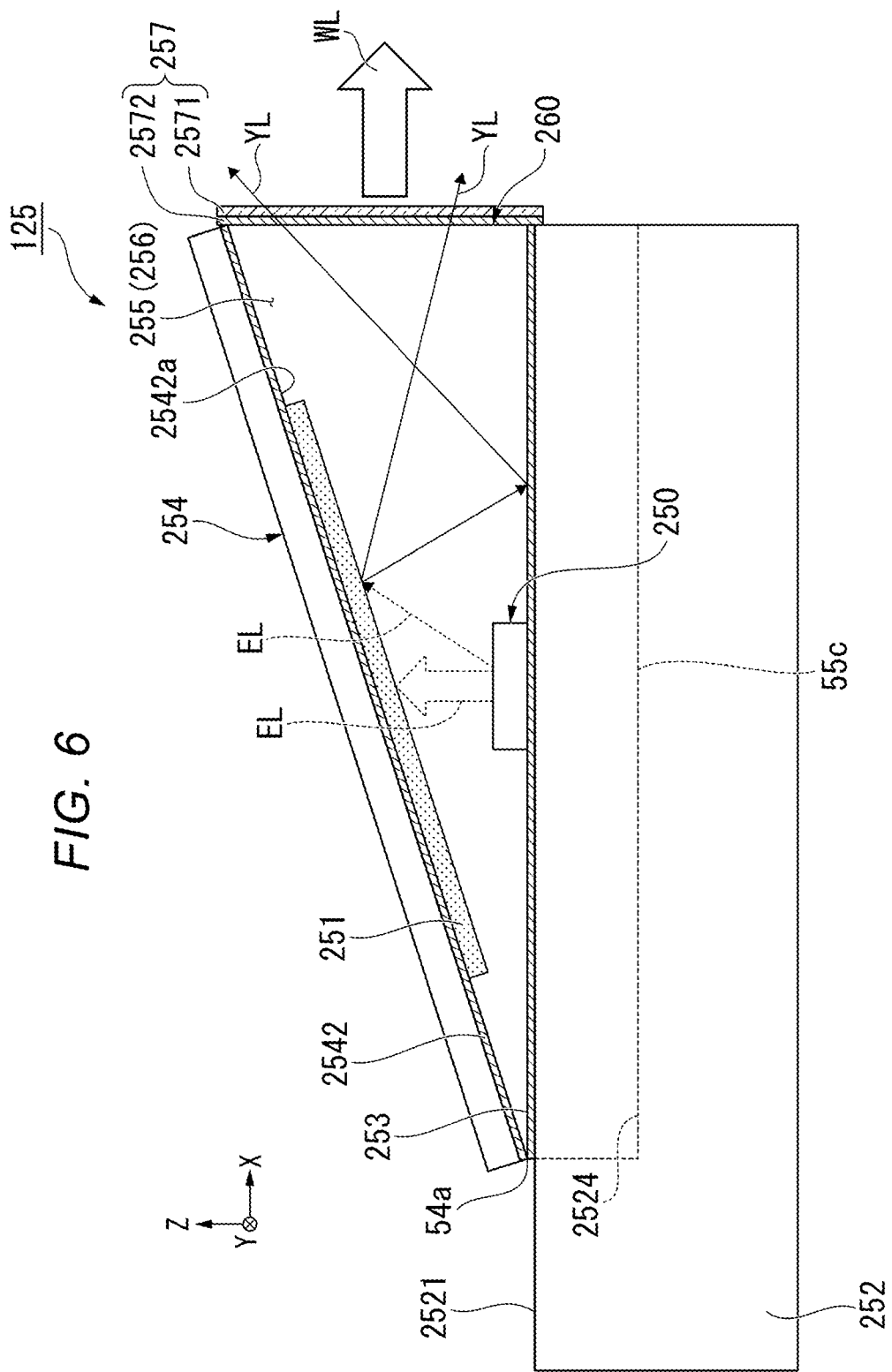
FIG. 6 shows a configuration of a light source device of a second embodiment.

FIG. 6 shows the configuration of the light source device of the embodiment.

As shown in FIG. 6, a light source 125 of the embodiment includes the light source 250, the phosphor layer 251, the substrate 252, the mirror layer 253, the first optical member 254, the second optical member 257, the third optical member 255, the fourth optical member 256, and the light emitting portion 260.

In the embodiment, the light source 250 is placed on the supporting surface 2521 of the substrate 252. That is, no concave portion is formed in the supporting surface 2521 of the substrate 252. The mirror layer 253 is formed between the light source 250 and the supporting surface 2521. The phosphor layer 251 is placed on an inner surface (a surface at the substrate 252 side) 2542a of the first optical layer 2542. In the case of the embodiment, the phosphor layer 251 is placed to face the light source 250.

The excitation light EL output from the light source 250 enters the phosphor layer 251 placed to face the light source 250. The phosphor layer 251 outputs the fluorescence YL generated by wave conversion of the excitation light EL. At least a part of the fluorescence YL output from the phosphor layer 251 is transmitted through the second optical layer 2572 of the second optical member 257 covering the light emitting portion 260 and output as the illumination light WL.

A part of the excitation light EL is reflected by the first optical layer 2542 of the first optical member 254, travels toward the light emitting portion 260, and is reflected by the second optical layer 2572 of the second optical member 257 covering the light emitting portion 260. The excitation light EL reflected by the second optical layer 2572 enters the phosphor layer 251 via the mirror layer 253 and at least one of the third optical member 255 and the fourth optical member 256, or directly enters the phosphor layer not via either, and thereby, the excitation light is reused for excitation of the fluorescence YL.

As described above, also, in the light source device 125 of the embodiment, the excitation light EL output from the light source 250 may be efficiently entered into the phosphor layer 251 and the fluorescence YL generated in the phosphor layer 251 may be output from the light emitting portion 260 as the illumination light WL. Therefore, according to the light source device 125 of the embodiment, the bright illumination light WL may be output from the light emitting portion 260.

Note that, in the embodiment, the light source 250 may be placed in the concave portion 261 formed in the substrate 252.

Third Embodiment

Subsequently, a configuration of a light source device according to a third embodiment of the present disclosure is explained. In the embodiment, the configurations or members in common with the first embodiment have the same signs and the explanation of the details is omitted.

Figure 7:
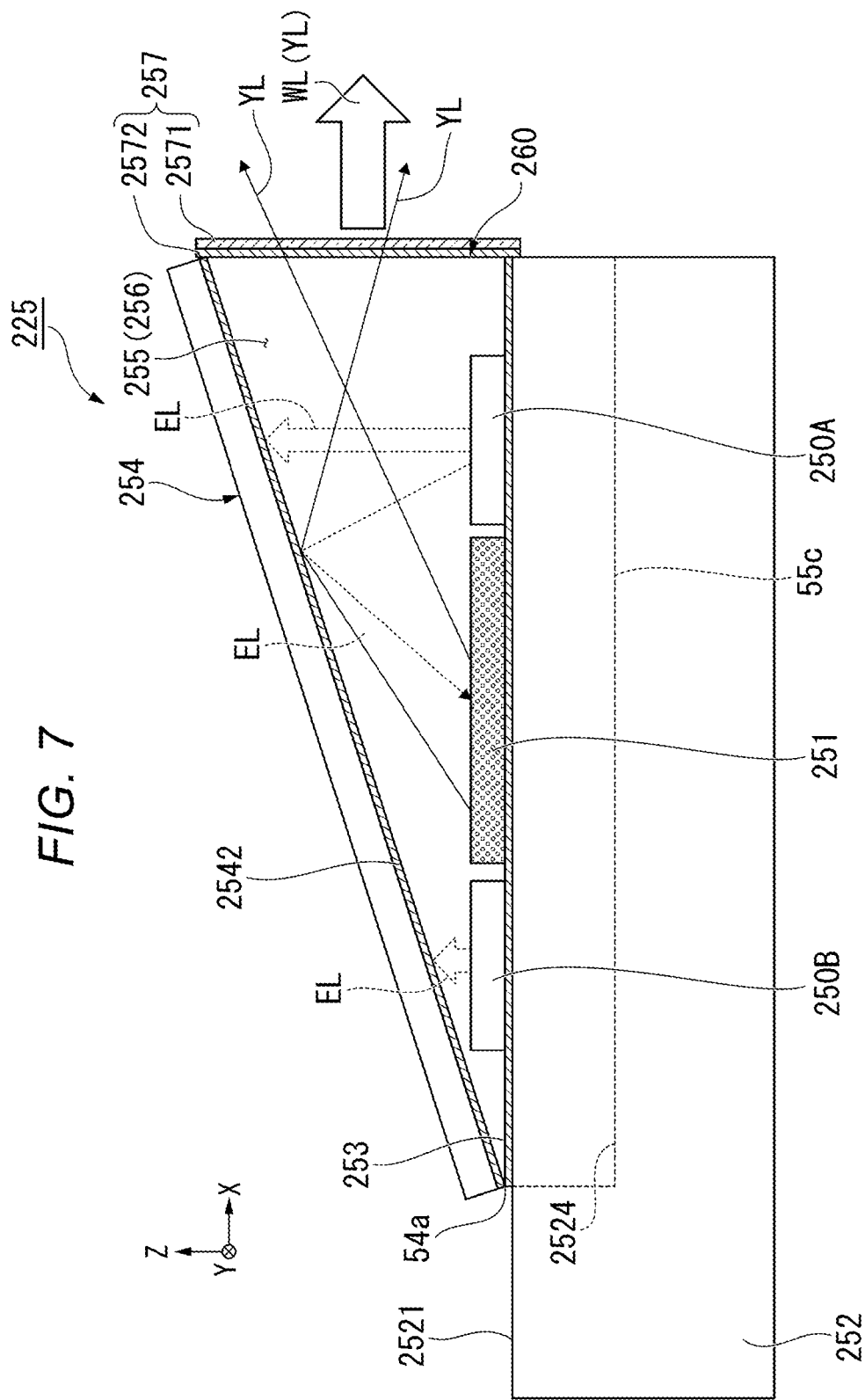
FIG. 7 shows a configuration of a light source device of a third embodiment.

FIG. 7 shows the configuration of the light source device of the embodiment.

As shown in FIG. 7, a light source device 225 of the embodiment includes a first light source 250A, a second light source 250B, the phosphor layer 251, the substrate 252, the mirror layer 253, the first optical member 254, the second optical member 257, the third optical member 255, the fourth optical member 256, and the light emitting portion 260.

In the embodiment, the first light source 250A and the second light source 250B respectively have the same configuration as the light source 250 of the first embodiment. That is, the first light source 250A and the second light source 250B output excitation lights EL in a blue wavelength range (first wavelength range) from 400 nm to 480 nm.

The first light source 250A and the second light source 250B are placed on the supporting surface 2521 of the substrate 252. Like the second embodiment, no concave portion is formed in the supporting surface 2521 of the substrate 252. The mirror layer 253 is formed between the first light source 250A and second light source 250B and the supporting surface 2521.

The first light source 250A is placed at the light emitting portion 260 side (+X side) with respect to the phosphor layer 251 and the second light source 250B is placed at the opposite side (−X side) to the light emitting portion 260 with respect to the phosphor layer 251. The first light source 250A, the phosphor layer 251, and the second light source 250B are placed in line in the X-axis directions on the supporting surface 2521 of the substrate 252.

According to the light source device 225 of the embodiment, the phosphor layer 251 is excited by the excitation lights EL output from the first light source 250A and the second light source 250B, and thereby, the phosphor layer 251 may be efficiently excited. In the case of the embodiment, the phosphor layer 251 is placed between the first light source 250A and the second light source 250B, and thereby, the excitation lights EL output from the first light source 250A and the second light source 250B may be respectively entered into the phosphor layer 251 with balance and the bright fluorescence YL may be generated.

Note that, in the embodiment, the first light source 250A and the second light source 250B may be placed in the concave portion 261 formed in the supporting surface 2521 of the substrate 252.

Fourth Embodiment

Subsequently, a configuration of a light source device according to a fourth embodiment of the present disclosure is explained. In the embodiment, the configurations or members in common with the first embodiment have the same signs and the explanation of the details is omitted.

Figure 8:
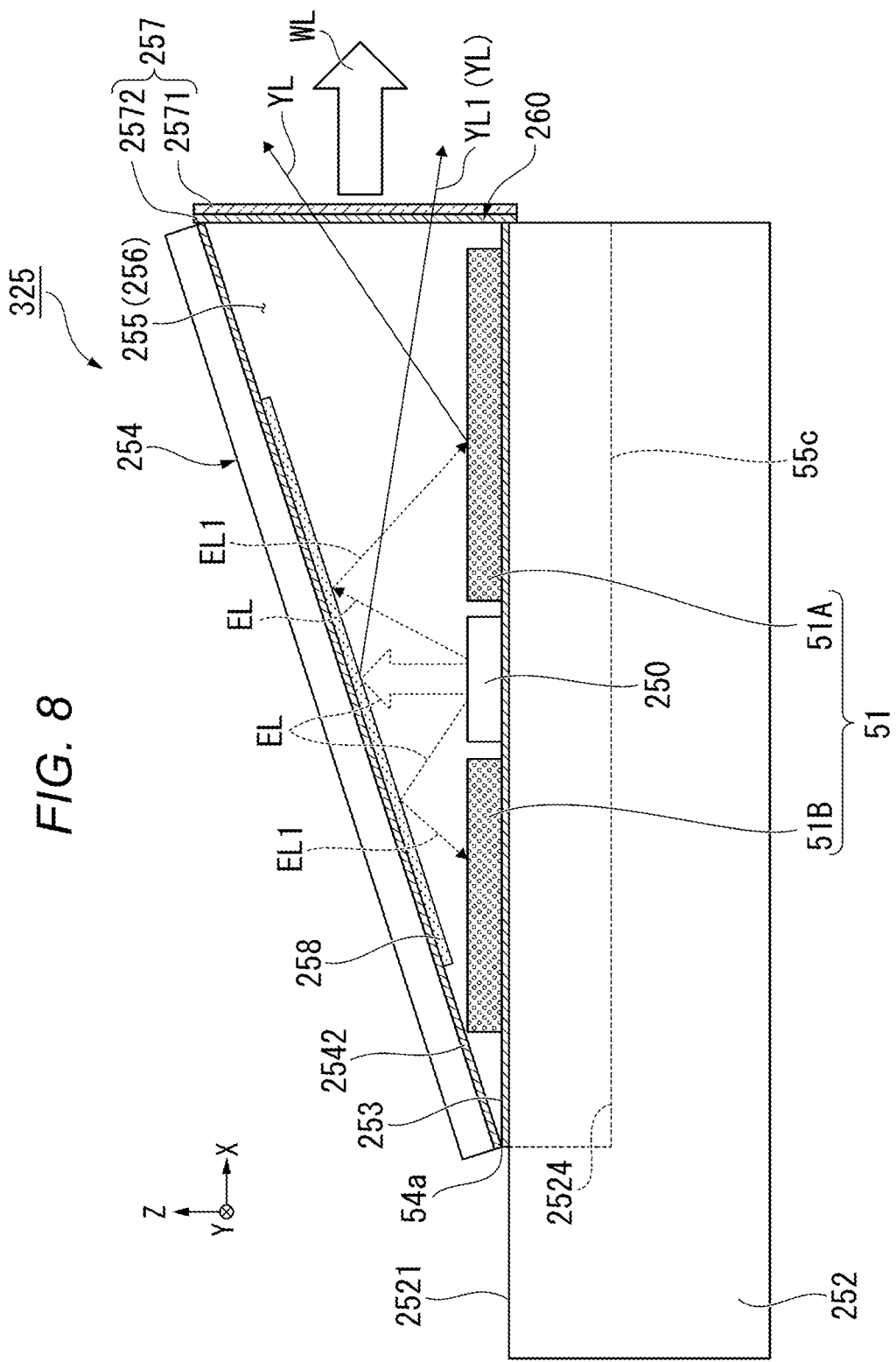
FIG. 8 shows a configuration of a light source device of a fourth embodiment.

FIG. 8 shows the configuration of the light source device of the embodiment.

As shown in FIG. 8, a light source device 325 of the embodiment includes the light source 250, a first phosphor layer (first wavelength conversion layer) 51, a second phosphor layer (second wavelength conversion layer) 258, the substrate 252, the mirror layer 253, the first optical member 254, the second optical member 257, the third optical member 255, the fourth optical member 256, and the light emitting portion 260.

The first phosphor layer 51 of the embodiment includes a first region 51A and a second region 51B placed apart from each other. The first region 51A and the second region 51B are respectively formed using the same phosphor material as that of the phosphor layer 251 of the first embodiment. The light source 250 is placed between the first region 51A and the second region 51B. The light source 250 is placed on the supporting surface 2521 between the first region 51A and the second region 51B. Also, in the embodiment, no concave portion is formed in the supporting surface 2521 of the substrate 252.

The second phosphor layer 258 is placed on the inner surface (the surface at the substrate 252 side) 2542a of the first optical layer 2542. In the case of the embodiment, the second phosphor layer 258 is formed using the same phosphor material as that of the first phosphor layer 51. The second phosphor layer 258 converts the excitation light EL into e.g., fluorescence YL1 as a yellow light having a yellow wavelength range from 550 to 640 nm different from the blue wavelength range (first wavelength range). That is, the second phosphor layer 258 converts a part of the excitation light EL output from the light source 250 into the fluorescence YL1.

In the embodiment, the yellow wavelength range (third wavelength range) of the fluorescence YL1 emitted by the second phosphor layer 258 is the same as the yellow wavelength range (second wavelength range) of the fluorescence YL emitted by the first phosphor layer 51.

In the embodiment, the degree of scattering of light in the second phosphor layer 258 is lower than the degree of scattering of light in the first phosphor layer 51. The degree of scattering of light may be adjusted by the number of scatterers contained in the phosphor. As the scatterers, pores or permeable particles having a different refractive index from the phosphor are used. In the case of the embodiment, the number of scatterers contained in the second phosphor layer 258 is smaller than the number of scatterers contained in the first phosphor layer 51. For example, the second phosphor layer 258 with less scatterers may be realized using a single-crystal phosphor.

In the second phosphor layer 258, backscatter of light is suppressed compared to that in the first phosphor layer 51, and thereby, the excitation light EL entering from the light source 250 easily travels within the phosphor without being scattered.

Further, in the case of the embodiment, the thickness of the second phosphor layer 258 is smaller than the thickness of the first phosphor layer 51. The thickness of the second phosphor layer 258 is a dimension of the surface on which the second phosphor layer 258 is provided (the front surface of the first optical layer 2542 of the first optical member 254) in the normal direction, and the thickness of the first phosphor layer 51 is a dimension of the supporting surface 2521 on which the first phosphor layer 51 is provided in the normal direction.

The smaller the thickness of the phosphor, the more easily the excitation light is output from the phosphor before conversion into fluorescence.

In the embodiment, as described above, the backscatter and the thickness of the second phosphor layer 258 are suppressed compared to those of the first phosphor layer 51, and thereby, fluorescence conversion efficiency of the second phosphor layer 258 is suppressed. Thereby, a large part of the excitation light EL output from the light source 250 is not converted into the fluorescence in the second phosphor layer 258, but transmitted through the second phosphor layer 258, enters the first optical member 254, and is reflected by the first optical layer 2542 of the first optical member 254. At least a part of the excitation light EL reflected by the first optical layer 2542 is transmitted through the second phosphor layer 258 and output from the second phosphor layer 258 toward the first phosphor layer 51.

Note that, with respect to the first phosphor layer 51, the fluorescence conversion amount may be controlled by adjustment of only the quantity of scatterers or the thickness of the second phosphor layer 258.

In the second phosphor layer 258, a part of the fluorescence YL1 is directly output from the second phosphor layer 258 and the other part of the fluorescence YL1 is reflected by the first optical member 254 and output.

The second phosphor layer 258 outputs a large part of the excitation light EL without wavelength conversion in addition to the fluorescence YL1 formed by wavelength conversion of the excitation light EL. That is, the second phosphor layer 258 outputs a light containing the fluorescence YL1 and the excitation light EL.

In the embodiment, the first phosphor layer 51 converts a part of the excitation light EL output from the second phosphor layer 258 into the fluorescence YL. That is, the first phosphor layer 51 is excited by a part of the excitation light EL output from the light source 250 and indirectly entering via the second phosphor layer 258.

In the embodiment, the excitation light EL output from the light source 250 enters the whole second phosphor layer 258. In the second phosphor layer 258, backscatter and the thickness are suppressed compared to those of the first phosphor layer 51, and the fluorescence conversion efficiency is suppressed, and thereby, a large part of the excitation light EL is not converted into the fluorescence, but transmitted through the second phosphor layer 258 and enters the first optical layer 2542 of the first optical member 254. The first optical layer 2542 reflects the excitation light EL toward the supporting surface 2521 of the substrate 252. At least a part of the excitation light EL reflected by the first optical layer 2542 is transmitted through the second phosphor layer 258 and output toward the supporting surface 2521 of the substrate 252. Note that a part of the excitation light E1 is backscattered within the second phosphor layer 258 or reflected by the front surface and output toward the supporting surface 2521 of the substrate 252.

As described above, the second phosphor layer 258 outputs the excitation light EL toward the supporting surface 2521 of the substrate 252.

Note that a part of the excitation light EL entering the second phosphor layer 258 is converted into the fluorescence YL1. The fluorescence YL1 is output from the second phosphor layer 258 via the first optical layer 2542 or not via the first optical layer 2542. At least a part of the fluorescence YL1 output from the second phosphor layer 258 is transmitted through the second optical member 257 and output from the light emitting portion 260 as the illumination light WL.

Or, a part of the fluorescence YL1 enters the supporting surface 2521 of the substrate 252 and is reflected by the mirror layer 253 formed on the supporting surface 2521. At least a part of the fluorescence YL1 reflected by the mirror layer 253 is transmitted through the second optical member 257 and output from the light emitting portion 260 as the illumination light WL.

Further, a part of the fluorescence YL1 enters the first phosphor layer 51, is backscattered within the first phosphor layer 51 or reflected by the front surface, transmitted through the second optical member 257, and output from the light emitting portion 260 as the illumination light WL. Also, a part of the fluorescence YL1 entering the first phosphor layer 51 is transmitted through the first phosphor layer 51 and reflected by the mirror layer 253, thereby, the part of the fluorescence YL1 is transmitted through the second optical member 257 and output from the light emitting portion 260 as the illumination light WL.

An excitation light EL1 output from the second phosphor layer 258 enters the first region 51A and the second region 51B of the first phosphor layer 51. As described above, in the first phosphor layer 51, the fluorescence conversion efficiency is increased by increase of the degree of scattering of light and the thickness compared to the second phosphor layer 258. Accordingly, most of the excitation light EL1 output from the second phosphor layer 258 is converted into the fluorescence YL in the first phosphor layer 51 (the first region 51A and the second region 51B). A part of the fluorescence YL output from the first phosphor layer 51 is transmitted through the second optical member 257 and output from the light emitting portion 260 as the illumination light WL.

Further, a part of the fluorescence YL output from the first phosphor layer 51 enters the second phosphor layer 258 and is backscattered in the second phosphor layer 258, and transmitted through the second optical member 257 and output from the light emitting portion 260 as the illumination light WL.

A part of the fluorescence YL entering the second phosphor layer 258 is transmitted through the second phosphor layer 258, reflected by the first optical layer 2542 of the first optical member 254, and output from the second phosphor layer 258, and transmitted through the second optical member 257 and output from the light emitting portion 260 as the illumination light WL.

A part of the fluorescence YL reflected by the first optical layer 2542 of the first optical member 254 enters the supporting surface 2521 of the substrate 252, is reflected by the mirror layer 253 formed in the supporting surface 2521, transmitted through the second optical member 257, and output from the light emitting portion 260 as the illumination light WL.

A part of the excitation light EL and parts of the fluorescence YL, YL1 enter the third optical member 255 or the fourth optical member 256 via the mirror layer 253 or directly enter the third optical member 255 or the fourth optical member 256 not via the mirror layer 253. A part of the excitation light EL and parts of the fluorescence YL, YL1 are reflected by the third optical member 255 or the fourth optical member 256, and transmitted through the second optical member 257 and output from the light emitting portion 260 as the illumination light WL.

Note that a part of the excitation light EL and parts of the fluorescence YL, YL1 propagate in the opposite direction (−X side) to the light emitting portion 260, however, are repeatedly reflected and eventually output from the light emitting portion 260.

As described above, in the light source device 325 of the embodiment, the illumination light WL containing the fluorescence YL generated in the first phosphor layer 51 and the fluorescence YL1 generated in the second phosphor layer 258 may be output from the light emitting portion 260.

According to the source device 325 of the embodiment, the fluorescence YL1 generated in the second phosphor layer 258 and the fluorescence YL generated in the first phosphor layer 51 may be extracted from the light emitting portion 260 as the illumination light WL. Therefore, according to the source device 325 of the embodiment, the bright illumination light WL may be output from the light emitting portion 260.

Further, in the case of the embodiment, it is not necessary to place the light source 250 within the cutout 251K like the first embodiment, but it is only necessary to place the first region 51A and the second region 51B with the light source 250 in between, and thereby, alignment of the first phosphor layer 51 with the light source 250 on the supporting surface 2521 of the substrate 252 is easier.

Note that, in the embodiment, the light source 250 may be placed in a cutout formed in the first phosphor layer 51. Further, the light source 250 may be placed in the concave portion 261 formed in the supporting surface 2521 of the substrate 252.

First Modified Example

In the fourth embodiment, the second phosphor layer 258 is formed using the same phosphor material as that of the first phosphor layer 51, however, may be formed using a different phosphor material.

Figure 9:
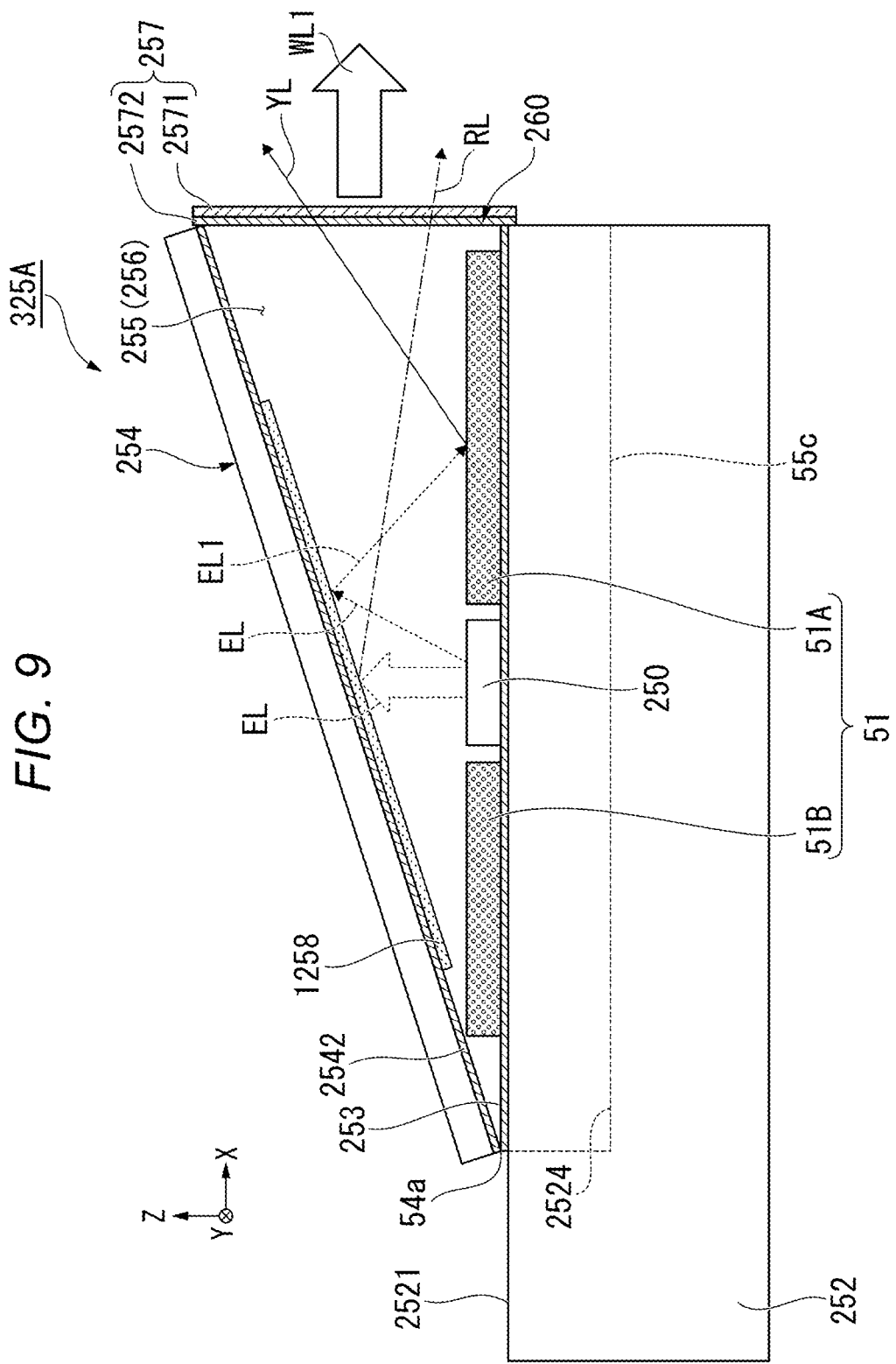
FIG. 9 shows a configuration of a light source device of a first modified example.

FIG. 9 shows a configuration of a light source device of the modified example.

As shown in FIG. 9, a light source device 325A of the modified example includes the light source 250, the first phosphor layer 51, a second phosphor layer (second wavelength conversion layer) 1258, the substrate 252, the mirror layer 253, the first optical member 254, the second optical member 257, the third optical member 255, the fourth optical member 256, and the light emitting portion 260.

The second phosphor layer 1258 of the modified example converts the excitation light EL into e.g., fluorescence (third light) RL as a red light having a red wavelength range from 600 to 800 nm different from the blue wavelength range. In the embodiment, the red wavelength range (third wavelength range) of the fluorescence RL emitted by the second phosphor layer 1258 is larger than the yellow wavelength range (second wavelength range) of the fluorescence YL emitted by the first phosphor layer 51 and the blue wavelength range (first wavelength range) of the excitation light EL output by the light source 250. The fluorescence RL is transmitted through the second optical member 257.

As the red phosphor, e.g., a YAG phosphor (one of Pr:YAG, Eu:YAG, Cr:YAG) of $(Y_{1-x},Gd_x)_3(Al, Ga)_5O_{12}$ in which one of Pr, Eu, Cr is dispersed as an activator agent is used. Note that the activator agent may contain one kind selected from Pr, Eu, Cr or a coactivating activator agent containing some kinds selected from Pr, Eu, Cr.

Note that the first phosphor layer 51 may be formed using a single phosphor like the phosphor layers 251 of the first and second embodiments.

In the embodiment, the degree of scattering of light in the second phosphor layer 1258 is lower than the degree of scattering of light in the phosphor layer 251. In the case of the embodiment, the number of scatterers contained in the second phosphor layer 1258 is smaller than the number of scatterers contained in the first phosphor layer 51.

Further, in the embodiment, the thickness of the second phosphor layer 1258 is set to be smaller than the thickness of the first phosphor layer 51, and thereby, the fluorescence conversion efficiency in the second phosphor layer 1258 is suppressed and the excitation light EL is easily transmitted.

According to the light source device 325A of the modified example, the fluorescence RL generated in the second phosphor layer 1258 and the fluorescence YL generated in the first phosphor layer 51 may be extracted from the light emitting portion 260 as an illumination light WL1.

Here, for example, when a white illumination light at 6500 K is generated, if only the yellow fluorescence is used, the red component is insufficient. On the other hand, in the light source device 325A of the modified example, the red component of the illumination light WL1 may be supplemented by the fluorescence RL as the red light generated in the second phosphor layer 1258. Therefore, according to the light source device 325A of the modified example, the yellow illumination light WL1 sufficiently containing the red component with high color reproductivity may be generated.

Thus, according to a projector including the light source device 325A of the embodiment, an image with high brightness and high red reproductivity may be projected.

Second Modified Example

In the first modified example, the phosphor generating the yellow fluorescence is used as the first phosphor layer 51, however, a phosphor generating fluorescence in a different color may be used.

Figure 10:
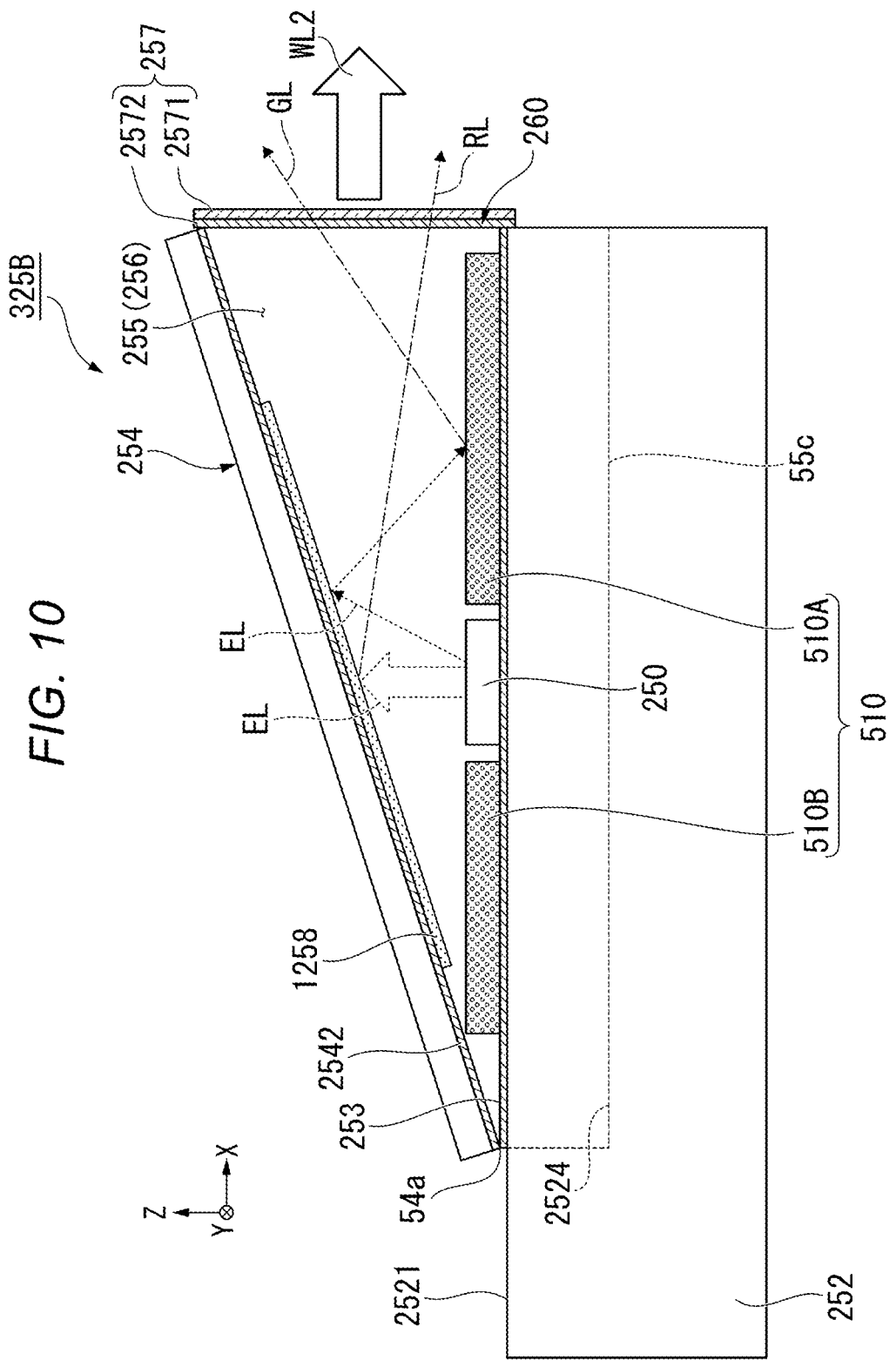
FIG. 10 shows a configuration of a light source device of a second modified example.

FIG. 10 shows a configuration of a light source device of the modified example.

As shown in FIG. 10, a light source device 325B of the modified example includes the light source 250, a first phosphor layer 510, the second phosphor layer 1258, the substrate 252, the mirror layer 253, the first optical member 254, the second optical member 257, the third optical member 255, the fourth optical member 256, and the light emitting portion 260.

The first phosphor layer 510 includes a first region 510A and a second region 510B placed apart from each other. In the modified example, the first phosphor layer 510 converts the excitation light EL into e.g., fluorescence (second light) GL as a green light having a green wavelength range from 500 to 570 nm different from the blue wavelength range. The second phosphor layer 1258 converts the excitation light EL into e.g., the fluorescence (third light) RL as a red light having a red wavelength range from 600 to 800 nm different from the blue wavelength range. In the modified example, the red wavelength range (third wavelength range) of the fluorescence RL emitted by the second phosphor layer 1258 is larger than the green wavelength range (second wavelength range) of the fluorescence GL emitted by the first phosphor layer 510 and the blue wavelength range (first wavelength range) of the excitation light EL output by the light source 250. The fluorescence GL is transmitted through the second optical member 257.

As the green phosphor forming the first phosphor layer 510, a phosphor material e.g., a $Lu_3Al_5O_{12}:Ce^{3+}$ phosphor, $Y_3O_4:Eu^{2+}$ phosphor, $(Ba, Sr)_2SiO_4:Eu^{2+}$ phosphor, $Ba_3Si_6O_{12}N_2:Eu^{2+}$ phosphor, $(Si, Al)_6(O, N)_8:Eu^{2+}$ phosphor is used. Note that the first phosphor layer 510 may be formed by two regions like the first phosphor layer 51 of the fourth embodiment or formed by a single phosphor like the phosphor layers 251 of the first and second embodiments.

In the modified example, the degree of scattering of light in the second phosphor layer 1258 is lower than the degree of scattering of light in the first phosphor layer 510. In the case of the embodiment, the number of scatterers contained in the second phosphor layer 1258 is smaller than the number of scatterers contained in the first phosphor layer 510.

Further, in the embodiment, the thickness of the second phosphor layer 1258 is set to be smaller than the thickness of the first phosphor layer 510, and thereby, the fluorescence conversion efficiency in the second phosphor layer 1258 is suppressed and the excitation light EL is easily transmitted.

According to the light source device 325B of the modified example, the fluorescence RL generated in the second phosphor layer 1258 and the fluorescence GL generated in the first phosphor layer 510 may be extracted from the light emitting portion 260 as a yellow illumination light WL2.

In the light source device 325B of the modified example, the fluorescence GL as a green light generated in the first phosphor layer 510 and the fluorescence RL as a red light generated in the second phosphor layer 1258 are used, and thereby, the yellow illumination light WL2 with high color reproductivity in red and green may be generated.

Thus, according to a projector including the light source device 325B of the modified example, an image with high brightness and high reproductivity of respective colors RG may be projected.

Note that the embodiments of the present disclosure are exemplified for explanation, however, the present disclosure is not limited to to the above descried embodiments, but various changes can be made without departing from the scope of the present disclosure.

For example, in the above descried embodiments, the case where the light emitting portion 260 is formed by the substrate 252, the first optical member 254, the third optical member 255, and the fourth optical member 256 is taken as an example, however, the light emitting portion may be formed at least by the substrate 252 and the first optical member 254.

Further, in the above descried embodiments, the case where the first optical member 254, the third optical member 255, and the fourth optical member 256 are formed by the respective separate members is taken as an example, however, the first optical member 254, the third optical member 255, and the fourth optical member 256 may be integrally formed by a single member.

In the first embodiment, the case where the width of the back surface 2513 of the phosphor layer 251 in the Y directions is smaller than the width of the supporting surface 2521 located within the housing space S in the Y directions is taken as an example, however, the width of the back surface 2513 of the phosphor layer 251 in the Y directions and the width of the supporting surface 2521 located within the housing space S in the Y directions may be the same. In this case, the side surface 2512 of the phosphor layer 251 is in contact with the third optical member 255 and the fourth optical member 256, and thereby, the fluorescence YL output from the side surface 2512 is reflected by the third optical member 255 and the fourth optical member 256 and returned into the first phosphor layer 51.

Note that, in the other embodiments and modified examples, the width of the phosphor layer in the Y directions may be the same as the width of the supporting surface 2521 in the Y directions.

In the above described embodiments, the projector 1 including the three light modulation devices 4R, 4G, 4B is taken as an example, however, the present disclosure can be applied to a projector displaying a color picture by a single light modulation device. Further, the light modulation device is not limited to the above described liquid crystal panel, but, e.g., a digital mirror device or the like may be used.

Further, in the above described embodiments, the example in which the light source device according to the present disclosure is applied to the projector is shown, however, the present disclosure is not limited to that. The light source device according to the present disclosure may be applied to a lighting device such as a headlight for automobile.

A light source device according to an aspect of the present disclosure may have the following configurations.

A light source device according to an aspect of the present disclosure includes a substrate having a supporting surface, a first light source placed at the supporting surface side of the substrate and outputting a first light in a first wavelength range, a first optical member having a first optical layer facing the supporting surface and reflecting the first light output from the first light source, a first wavelength conversion layer having a light incident surface that the first light output from the first light source enters, converting the first light into a second light in a second wavelength range different from the first wavelength range, and outputting the second light from the light incident surface, a light emitting portion formed by at least the substrate and the first optical member and outputting a light, and a second optical member having a second optical layer reflecting the first light and transmitting the second light and placed in the light emitting portion, wherein the first optical layer is inclined relative to the light incident surface and reflects the second light, the first wavelength conversion layer is placed on one of a surface at the substrate side of the first optical layer and the supporting surface of the substrate, and the light emitting portion outputs the second light.

In the light source device according to the aspect of the present disclosure, the first wavelength conversion layer may have a cutout formed by partially cutting out and placed on the supporting surface of the substrate, and the first light source may be placed in the cutout of the first wavelength conversion layer.

The light source device according to the aspect of the present disclosure may further include a second light source placed at the supporting surface side of the substrate and outputting the first light in the first wavelength range, wherein the first wavelength conversion layer may be placed on the supporting surface of the substrate.

In the light source device according to the aspect of the present disclosure, the first light source may be placed at the light emitting portion side with respect to the first wavelength conversion layer, and the second light source may be placed at an opposite side to the light emitting portion with respect to the first wavelength conversion layer.

In the light source device according to the aspect of the present disclosure, the first wavelength conversion layer may include a first region and a second region placed on the supporting surface of the substrate apart from each other, and the first light source may be placed between the first region and the second region.

In the light source device according to the aspect of the present disclosure, the first wavelength conversion layer may be placed on a surface at the substrate side of the first optical layer.

The light source device according to the aspect of the present disclosure may further include a second wavelength conversion layer placed on the other of the surface at the substrate side of the first optical layer and the supporting surface of the substrate and converting the first light into a third light in a third wavelength range different from the first wavelength range, wherein the first wavelength conversion layer may be placed on the supporting surface of the substrate, and the second wavelength conversion layer may be placed on the surface at the substrate side of the first optical layer.

In the light source device according to the aspect of the present disclosure, the third wavelength range may be the second wavelength range.

In the light source device according to the aspect of the present disclosure, the first light may be a blue light and the second light and the third light may be yellow lights, and the light emitting portion may output the second light and the third light.

In the light source device according to the aspect of the present disclosure, the third wavelength range may be larger than the first wavelength range and the second wavelength range.

In the light source device according to the aspect of the present disclosure, the first light may be a blue light, the second light may be a yellow light, and the third light may be a red light, and the light emitting portion may output the second light and the third light.

In the light source device according to the aspect of the present disclosure, the first light may be a blue light, the second light may be a green light, and the third light may be a red light, and the light emitting portion may output the second light and the third light.

In the light source device according to the aspect of the present disclosure, the first light source may have a light emitting device, a base member supporting the light emitting device, and a reflection layer provided between the base member and the light emitting device.

The light source device according to the aspect of the present disclosure may further include a light-transmissive member provided in contact with a light exiting side of the first light source.

In the light source device according to the aspect of the present disclosure, the light-transmissive member may have a third optical layer provided at an opposite side to the first light source, transmitting the first light, and reflecting the second light.

In the light source device according to the aspect of the present disclosure, the substrate may have a concave portion formed in the supporting surface, the first light source may be placed in the concave portion of the substrate, and a surface at the first optical member side of the light-transmissive member may be level with the light incident surface of the first wavelength conversion layer.

The light source device according to the aspect of the present disclosure may further include a third optical member having a fourth optical layer reflecting the first light and the second light and placed with the fourth optical layer crossing the supporting surface and the first optical layer, and a fourth optical member having a fifth optical layer reflecting the first light and the second light and placed with the fifth optical layer crossing the supporting surface and the first optical layer and facing the fourth optical layer, wherein the light emitting portion may be formed by the substrate, the first optical member, the third optical member, and the fourth optical member.

A projector according to an aspect of the present disclosure may have the following configurations.

A projector according to an aspect of the present disclosure includes the light source device according to the aspect of the present disclosure, a light modulation device modulating a light from the light source device, and a projection optical device projecting the light modulated by the light modulation device.

What is claimed is:

1. A light source device comprising:
   a substrate having a supporting surface;
   a first light source disposed at a supporting surface side of the substrate and configured to emit first light in a first wavelength range;
   a first optical member having a first optical layer facing the supporting surface and reflecting the first light emitted from the first light source;
   a first wavelength conversion layer having a light incident surface that the first light output from the first light source enters, and configured to convert the first light into second light in a second wavelength range different from the first wavelength range and emit the second light from the light incident surface;
   a light emitting portion formed by at least the substrate and the first optical member; and
   a second optical member disposed at the light emitting portion and having a second optical layer configured to reflect the first light and transmit the second light, wherein
   the first optical layer is inclined with respect to the light incident surface and configured to reflect further the second light,
   the first wavelength conversion layer is disposed on one of a surface at the substrate side of the first optical layer and the supporting surface of the substrate, and
   the light emitting portion emits the second light.

2. The light source device according to claim 1, wherein
   the first wavelength conversion layer has a cutout formed by partially cutting out and is disposed on the supporting surface of the substrate, and
   the first light source is disposed in the cutout of the first wavelength conversion layer.

3. The light source device according to claim 1, further comprising
   a second light source disposed at the supporting surface side of the substrate and configured to emit the first light in the first wavelength range, wherein
   the first wavelength conversion layer is disposed on the supporting surface of the substrate.

4. The light source device according to claim 3, wherein
   the first light source is disposed at a light emitting portion side with respect to the first wavelength conversion layer, and
   the second light source is disposed at an opposite side to the light emitting portion with respect to the first wavelength conversion layer.

5. The light source device according to claim 1, wherein
   the first wavelength conversion layer includes a first region and a second region which are disposed on the supporting surface of the substrate and separate from each other, and
   the first light source is disposed between the first region and the second region.

6. The light source device according to claim 1,
   wherein the first wavelength conversion layer is disposed on the surface at the substrate side of the first optical layer.

7. The light source device according to claim 1, further comprising
   a second wavelength conversion layer disposed on the other of the surface at the substrate side of the first optical layer and the supporting surface of the substrate and configured to convert the first light into third light in a third wavelength range different from the first wavelength range, wherein
   the first wavelength conversion layer is disposed on the supporting surface of the substrate, and
   the second wavelength conversion layer is disposed on the surface at the substrate side of the first optical layer.

8. The light source device according to claim 7,
   wherein the third wavelength range is the second wavelength range.

9. The light source device according to claim 8, wherein
   the first light is blue light and each of the second light and the third light is yellow light, and
   the light emitting portion emits the second light and the third light.

10. The light source device according to claim 7,
    wherein the third wavelength range is larger than each of the first wavelength range and the second wavelength range.

11. The light source device according to claim 10, wherein
    the first light is blue light, the second light is yellow light, and the third light is red light, and
    the light emitting portion emits the second light and the third light.

12. The light source device according to claim 10, wherein
    the first light is blue light, the second light is green light, and the third light is red light, and
    the light emitting portion emits the second light and the third light.

13. The light source device according to claim 1,
    wherein the first light source has a light emitting device, a base supporting the light emitting device, and a reflection layer disposed between the base member and the light emitting device.

14. The light source device according to claim 1, further comprising
    a light-transmissive member provided in contact with a light exiting side of the first light source.

15. The light source device according to claim 14,
    wherein the light-transmissive member has a third optical layer disposed at an opposite side to the first light source, and configured to transmit the first light and reflect the second light.

16. The light source device according to claim 14, wherein
    the substrate has a concave portion formed in the supporting surface, the first light source is disposed in the concave portion of the substrate, and a surface at a first optical member side of the light-transmissive member is flush with the light incident surface of the first wavelength conversion layer.

17. The light source device according to claim 1, further comprising:

a third optical member having a fourth optical layer configured to reflect the first light and the second light, the fourth optical layer intersecting the supporting surface and the first optical layer; and a fourth optical member having a fifth optical layer configured to reflect the first light and the second light, the fifth optical layer intersecting the supporting surface and the first optical layer and facing the fourth optical layer, wherein the light emitting portion is formed by the substrate, the first optical member, the third optical member, and the fourth optical member.

18. A projector comprising:

the light source device according to claim 1;

a light modulation device modulating a light emitted from the light source device; and a projection optical device projecting the light modulated by the light modulation device.

* * * * *